US009975440B1

(12) United States Patent
Song et al.

(10) Patent No.: US 9,975,440 B1
(45) Date of Patent: May 22, 2018

(54) CHARGE PORT COVERING ASSEMBLY AND METHOD

(71) Applicant: Ford Global Technologies, LLC, Dearborn, MI (US)

(72) Inventors: Xiankai Song, Canton, MI (US); Michael Terrence Zitkovic, Dearborn, MI (US); Rodolfo Palma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/586,645

(22) Filed: May 4, 2017

(51) Int. Cl.
| H01R 13/44 | (2006.01) |
| B60L 11/18 | (2006.01) |
| H01R 13/453 | (2006.01) |

(52) U.S. Cl.
CPC ...... *B60L 11/1818* (2013.01); *H01R 13/4532* (2013.01); *B60Y 2200/92* (2013.01); *Y10S 903/904* (2013.01)

(58) Field of Classification Search
CPC  H01R 13/447; H01R 13/453; H01R 13/4532; H01R 13/4534; H01R 13/4536; H01R 13/4538
USPC ................................. 439/138, 139, 140, 142
See application file for complete search history.

(56) References Cited

U.S. PATENT DOCUMENTS

| 4,176,897 | A | * | 12/1979 | Cameron | ............... | H01R 13/44 |
| | | | | | | 439/137 |
| 5,234,350 | A | * | 8/1993 | Marechal | ........... | H01R 13/4532 |
| | | | | | | 439/139 |
| 7,364,444 | B2 | | 4/2008 | Kellock et al. | | |
| 8,333,600 | B2 | * | 12/2012 | Yanniello | ............... | H02B 11/24 |
| | | | | | | 439/138 |
| 8,353,711 | B2 | | 1/2013 | Huang et al. | | |
| 8,672,695 | B2 | * | 3/2014 | Baldwin | ............ | H01R 13/4534 |
| | | | | | | 439/137 |
| 8,808,013 | B2 | * | 8/2014 | Baldwin | ............ | H01R 13/4534 |
| | | | | | | 439/139 |
| 9,325,099 | B2 | * | 4/2016 | Coughlan | ............ | H01R 13/447 |
| 2012/0208384 | A1 | * | 8/2012 | Lazzaro | ............ | H01R 13/4534 |
| | | | | | | 439/149 |
| 2014/0206211 | A1 | * | 7/2014 | Coughlan | ............ | H01R 13/447 |
| | | | | | | 439/142 |

(Continued)

FOREIGN PATENT DOCUMENTS

| CN | 203503887 | 3/2014 |
| CN | 205044832 | 2/2016 |
| JP | 2007258058 | 10/2007 |

*Primary Examiner* — Hae Moon Hyeon
(74) *Attorney, Agent, or Firm* — Carlson, Gaskey & Olds, P.C.

(57) ABSTRACT

An exemplary charge port covering assembly includes a door assembly moveable between a covering position where the door assembly blocks access to a charge port, and an accessing position where the door assembly permits access to the charge port. A plurality of ring segments are configured to move to permit the door assembly to pivot from the covering position to the accessing position. An exemplary charge port covering method includes blocking access to a charge port using at least one door assembly in a covering position, and moving a charger toward a coupled position with the charge port to transition the at least one door assembly from the covering position to an accessing position.

20 Claims, 7 Drawing Sheets

(56) References Cited

U.S. PATENT DOCUMENTS

2015/0162691 A1* 6/2015 Choiselat .......... H01R 13/4532
439/139

* cited by examiner

CHARGE PORT COVERING ASSEMBLY AND METHOD

TECHNICAL FIELD

This disclosure relates to covering a charge port of an electrified vehicle. The covering can prevent inadvertent contact with electrical connectors and can block dust, contaminates, and unwanted objects from entering the charge port. The covering can also inhibit tampering.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles, such as PHEVs, can charge the traction battery from an external power source, such as a grid source. During a charge using the grid source, a charger electrically connects the vehicle to the external power source. The charger couples to a charge port of the vehicle during the charging.

Some electrified vehicle cover the charge port with a cover that an operator must remove prior to coupling the charger to the charge port.

SUMMARY

A charge port covering assembly according to an exemplary aspect of the present disclosure includes, among other things, a door assembly moveable between a covering position where the door assembly blocks access to a charge port, and an accessing position where the door assembly permits access to the charge port. Ring segments are configured to move to permit the door assembly to pivot from the covering position to the accessing position.

In a further non-limiting embodiment of the foregoing assembly, the door assembly is pivotably connected to at least one of the ring segments.

In a further non-limiting embodiment of any of the foregoing assemblies, the door assembly is spring-biased toward the covering position.

In a further non-limiting embodiment of any of the foregoing assemblies, the charge port is disposed along an axis, and the plurality of ring segments are distributed annularly about the axis.

In a further non-limiting embodiment of any of the foregoing assemblies, the plurality of ring segments are disposed within a bore of a housing. The bore has a diameter that increases moving axially toward the charge port such that the plurality of ring segments can move radially outward when a charger presses the plurality of ring segments into the bore.

In a further non-limiting embodiment of any of the foregoing assemblies, the assembly includes a lip extending radially inward toward the axis to support the door assembly in the covering position. Moving the plurality of ring segments radially outward moves the lip radially outward to permit the door assembly to pivot to the accessing position.

In a further non-limiting embodiment of any of the foregoing assemblies, the lip extends from at least one of the ring segments.

In a further non-limiting embodiment of any of the foregoing assemblies, the assembly includes an inner housing, an outer housing, and a lock. The lock limits axial movement of the inner housing relative to the outer housing when the at least one lock is in a locked position. The lock permits axial movement of the inner housing relative to the outer housing when the at least one lock is in an unlocked position. Moving the door assembly to the accessing position causes the door assembly to contact the lock and move lock from the locked position to the unlocked position.

In a further non-limiting embodiment of any of the foregoing assemblies, the lock is pivotably attached to the outer housing.

In a further non-limiting embodiment of any of the foregoing assemblies, the outer housing is circumferentially distributed about the charge port.

In a further non-limiting embodiment of any of the foregoing assemblies, the inner housing is spring-biased axially away from the outer housing.

A charge port covering method according to another exemplary aspect of the present disclosure includes, among other things, blocking access to a charge port using a door assembly in a covering position, and moving a charger toward a coupled position with the charge port to transition the door assembly from the covering position to an accessing position.

In a further non-limiting embodiment of the foregoing method, the door assembly is spring-biased toward the covering position.

A further non-limiting embodiment of any of the foregoing methods includes holding the door assembly in the covering position with a ledge, and moving the charger along an axis against ring segments to move the ledge radially outward and permit movement of the door assembly from the covering position to the assessing position.

A further non-limiting embodiment of any of the foregoing methods includes moving the charger against the ring segments to cause the ring segments to expand circumferentially relative to each other.

In a further non-limiting embodiment of any of the foregoing methods, the door assembly is pivotably attached to at least one of the plurality of ring segments.

In a further non-limiting embodiment of any of the foregoing methods, the ring segments are disposed within a first housing that is held in an extended position relative to a second housing by a lock in a locked position. Moving the door assembly to the accessing position transitions the lock to an unlocked position to permit the first housing to retract within the second housing.

In a further non-limiting embodiment of any of the foregoing methods, a charger moves to an electrically coupled position with the charge port as the first housing retracts within the second housing.

In a further non-limiting embodiment of any of the foregoing methods, the first housing is spring-biased toward the extended position.

In a further non-limiting embodiment of any of the foregoing methods, the lock is pivotably secured to the second housing.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to covering a charge port of an electrified vehicle with a covering assembly. Covering the charge port when a charger is not coupled to the charge port can prevent inadvertent contact or tampering with electrical contactors within the charge port. Tampering could include items like fingers, screwdrivers, other connectors, wires, metal rods, etc. moving toward the electrical contactors. The covering can additionally prevent contaminants, such as dust, from entering the charge port.

Notably, an operator does not need to remove the covering assembly prior to coupling a charger to the charge port. Instead, the charge port covering assembly moves from a position where the charge port is covered to a position where a charger can engage the charge port in response to the charger moving toward a coupled position with the charge port.

Referring to FIGS. 1 to 4, an exemplary vehicle 10 is a plug-in hybrid electric vehicle (PHEV) that includes a traction battery. In another example, the vehicle 10 is a battery electric vehicle (BEV). Other vehicles that incorporate charge ports are included within the scope of this disclosure.

Figure 1:
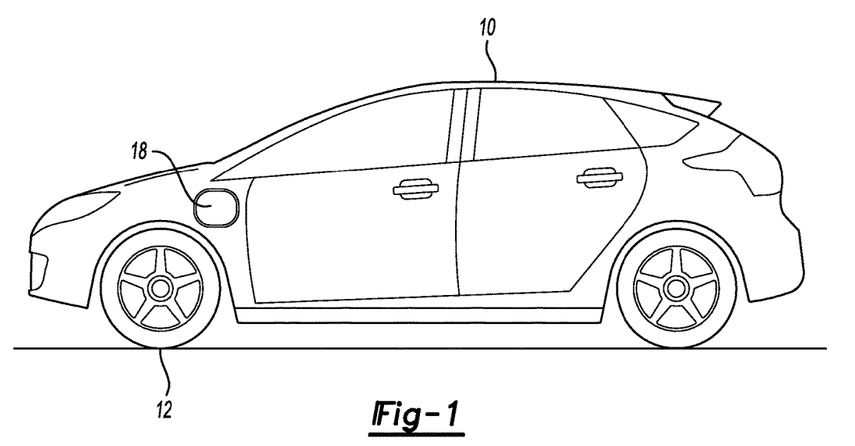
FIG. 1 illustrates a side view of an example electrified vehicle having a charge port.

A power-split powertrain of the vehicle 10 employs a first drive system and a second drive system. The first and second drive systems generate torque to drive one or more sets of vehicle drive wheels 12. The first drive system includes a combination of an internal combustion engine and a generator. The second drive system includes at least a motor, the generator, and the traction battery.

From time to time, charging the traction battery is required or desirable. When the vehicle 10 is moving, power from regenerative braking can charge the traction battery. When the vehicle 10 is stationary, an external power source, such as a grid source 14, can be used to charge the traction battery.

Figure 2:
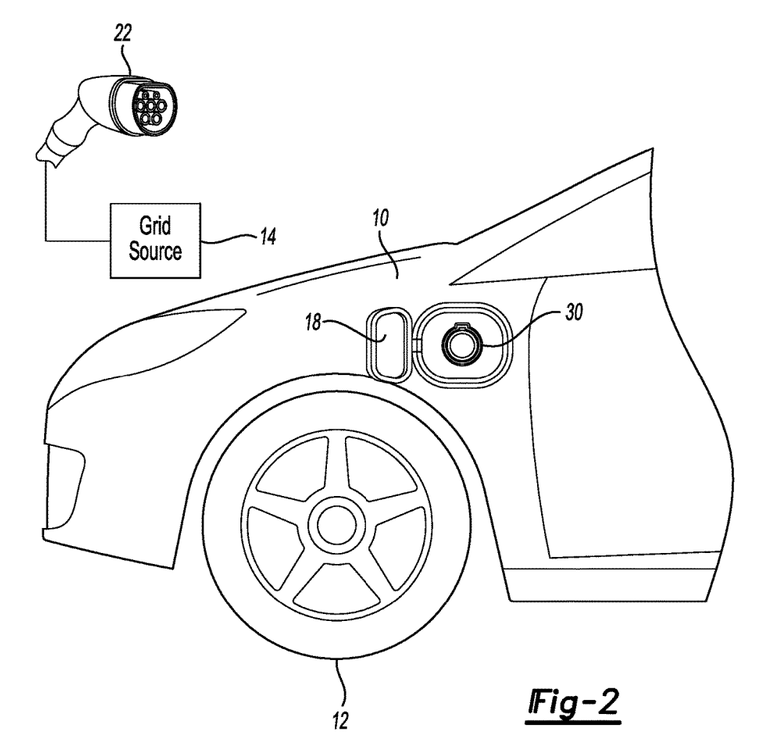
FIG. 2 illustrates a close-up view of the charge port of the electrified vehicle of FIG. 1 and a charger.

The vehicle 10 includes a charge port door 18 that, when closed, covers a charge port 20 of the vehicle 10. The charge port 20 provides an interface on the vehicle 10 permitting a charger 22 connected to the grid source 14 to couple to the charge port 20 on the vehicle 10. The charger 22 can draw electrical power from a grid source 14 at a vehicle operator's home, or at a public charging pole, for example.

The charge port 20, as can be appreciated, includes electrical connectors. The charge port door 18 can cover the charge port 20 to provide some protection to the charge port 20 and for aesthetics. The example charge port 20 is an alternating current ("AC") charge port. In another example, the charge port 20 is a direct current ("DC") charge port, or a combined AC/DC charge port.

Figure 3:
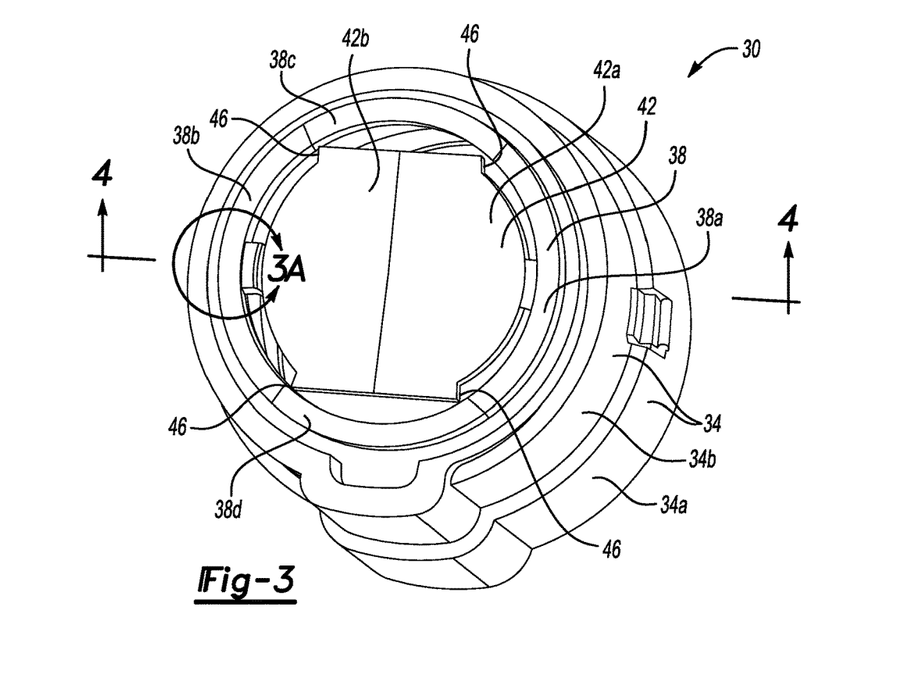
FIG. 3 illustrates a perspective view of a charge port covering assembly used in connection with the charge port of FIG. 2 and having a door assembly in a covering position.
Figure 3A:
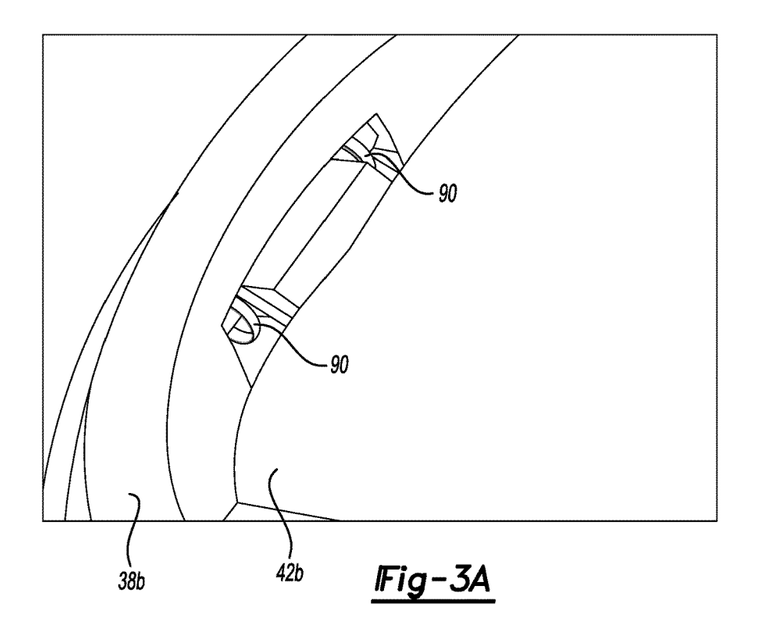
FIG. 3A illustrates a close-up view of Area 3A in FIG. 3.

The example vehicle 10 includes a charge port covering assembly 30 to provide additional protection to the charge port 20. Notably, the charge port covering assembly 30 can move to a position where the charge port covering assembly 30 covers the charge port 20, to a position where the charge port 20 can be accessed in response to movement of the charger 22 toward the charge port. An individual coupling the charger 22 to the charge port 20 is thus not required to remove any covering assembly prior to coupling the charger 22 to the charge port 20.

The example charge port 20 is near the vehicle drive wheels 12 in a forward area of the vehicle 10. In other examples, the charge port 20 could be located in other areas of the vehicle 10, such as another location that is easily accessible by the user. The protection provided by the charge port covering assembly 30 may provide more design flexibility when locating the charge port 20.

Referring now to FIGS. 3 to 6 with continuing reference to FIG. 2, the charge port covering assembly 30 includes, in this exemplary non-limiting embodiment, a housing 34, a plurality of ring segments 38, and a door assembly 42.

Figure 4:
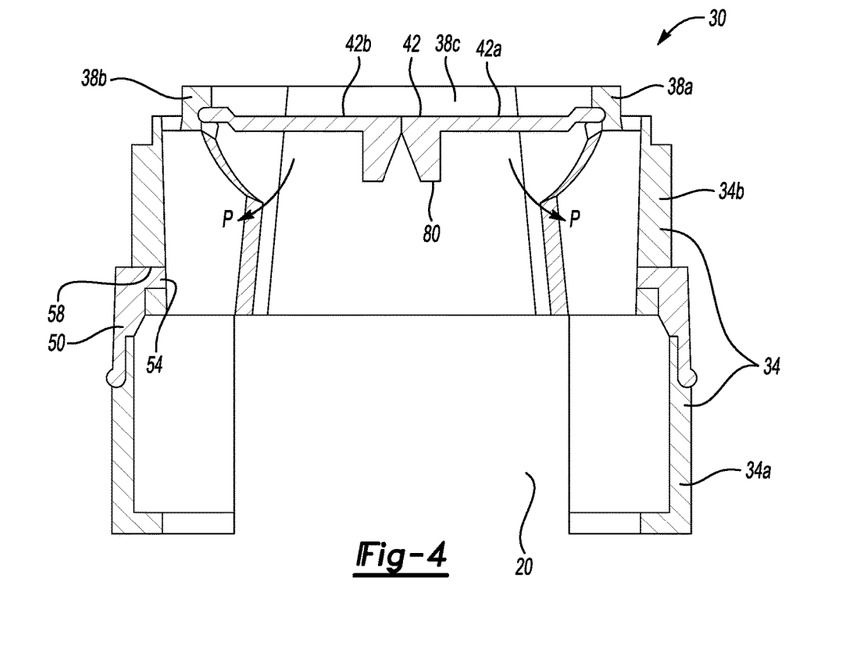
FIG. 4 illustrates a section of the charge port covering assembly taken at line 4-4 in FIG. 3.
Figure 5:
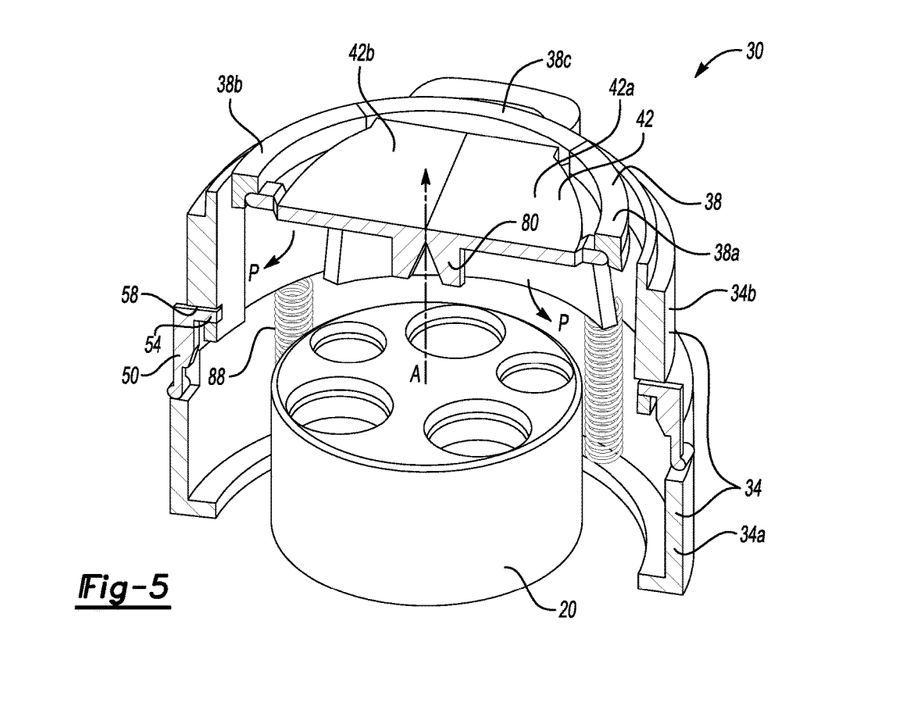
FIG. 5 illustrates a perspective view of the section of FIG. 4.

The housing 34 includes an outer housing 34a and an inner housing 34b. The housing 34, and the charge port covering assembly 30 in general, extends along an axis A from the charge port 20. The outer housing 34a, the inner housing 34b are distributed annularly about the axis A. The ring segments 38 are also distributed annularly about the axis A. The inner housing 34b is received within the outer housing 34a. The ring segments 38 are received within the inner housing 34b and the outer housing 34a.

The door assembly 42 is shown in a covering position where the door assembly 42 substantially covers the charge port 20 of the vehicle. The door assembly 42 includes a first door 42a and a second door 42b in this exemplary non-limiting embodiment.

The door 42a is pivotably connected to ring segment 38a. The door 42b is pivotably connected to ring segment 38b. The ring segment 38a is opposite the ring segment 38b. In another example, the doors 42a and 42b could be designed to pivotably connect to the inner housing 34b.

The doors 42a and 42b are configured to pivot in a direction P downward toward the charge port 20. Pivoting the doors 42a and 42b uncovers the charge port 20.

To prevent pivoting in the direction P and hold the doors 42a and 42b in the covering position, the ring segment 38c and the ring segment 38d include ledges provided by lips 46. The lips 46 extend beneath the door assembly 42 to prevent the door assembly 42 from pivoting inward in the direction P toward the charge port 20. The lips 46 hold the doors 42 in the covering position.

A plurality of locks 50 hold the axial position of the inner housing 34b relative to the outer housing 34a. In this non-limiting embodiment, the locks 50 are pivotably connected to the outer housing 34a.

FIGS. 3 to 5 show the locks 50 a locked position where the locks 50 are pivoted such that a tab 54 of the locks 50 extends into a respective aperture 58 of the inner housing 34b. Axial movement of the inner housing 34b relative to the outer housing 34a is prevented by the tab 54 contacting sides of the aperture 58. The locks 50 hold the inner housing 34b in an extended position relative to the outer housing 34a.

Figure 6:
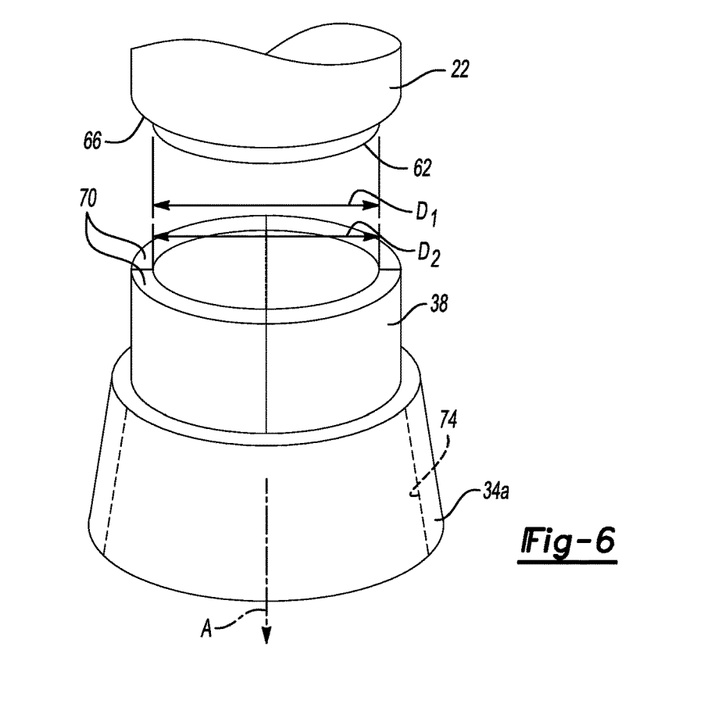
FIG. 6 illustrates a perspective view of the charger of FIG. 2 and selected portions of the charge port covering assembly when in the covering position of FIG. 3.

As shown in FIG. 6, the charger 22 has an extension 62 configured to fit within the ring segments 38. Generally, a diameter $D_1$ of the extension 62 closely matches a diameter $D_2$ of an opening provided by the ring segments 38 when the ring segments 38 are contacting each other circumferentially.

When the extension 62 is positioned within the opening provided by the ring segments 38, a body 66 of the charger 22 contacts axially facing surfaces 70 of the ring segments 38. The extension 62 of the charger 22 fits inside the opening.

Moving the charger 22 toward the charge port 20 presses the body 66 of the charger 22 against the axially facing surfaces 70 of the ring segments 38, which forces the ring segments 38 axially toward the vehicle 10. This forces the ring segments 38 further into a bore 74 provided by the outer housing 34a. Notably, the bore 74 is tapered such that the bore increases moving axially toward the charge port 20. The increasing diameter of the bore 74 permits the ring segments 38 to expand radially from the position of FIGS. 3 to 6 to the position of FIGS. 7 to 8. The direction of radial expansion for some of the ring segments is represented by directions R in FIG. 8.

Figure 7:
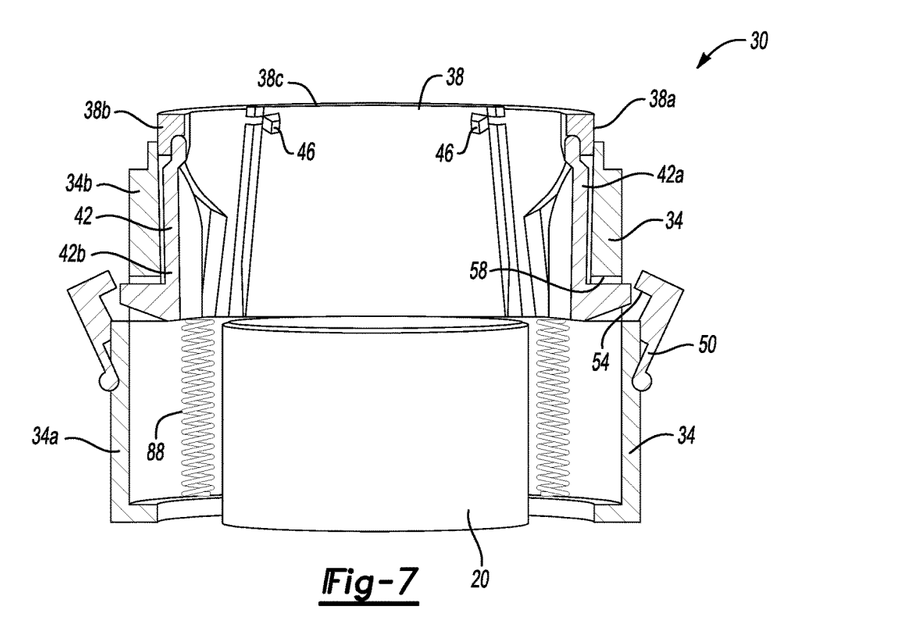
FIG. 7 illustrates the section of FIG. 4 after the charger has moved toward a coupled position with the charge port.
Figure 8:
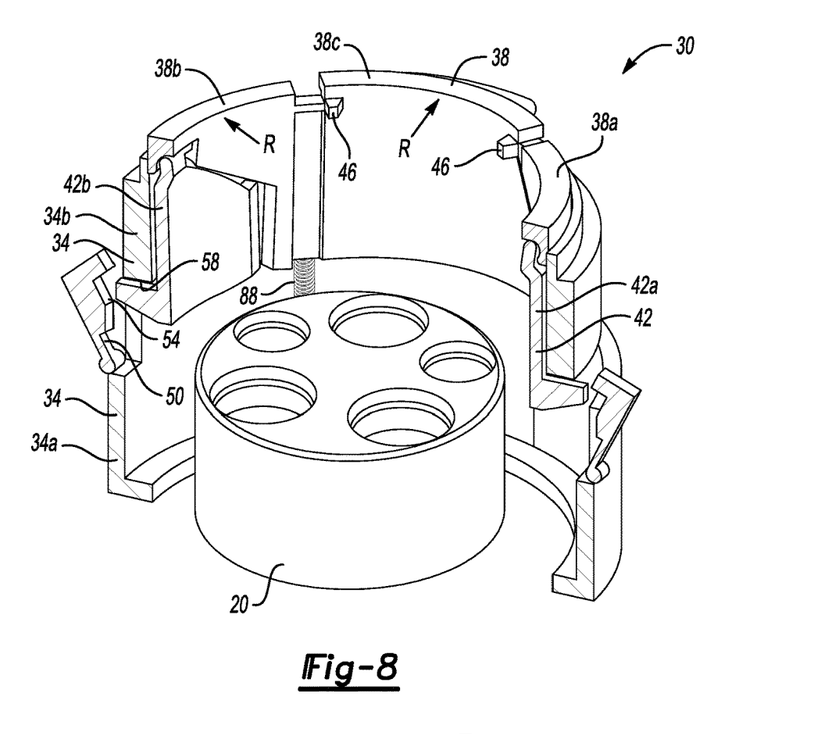
FIG. 8 illustrates a perspective view of the section of FIG. 6.

Radial expansion of the ring segments 38 withdraws the lips 46 from beneath the doors 42 permitting the doors 42 to pivot inwardly toward the charge port 20 in the direction P.

Figure 9:
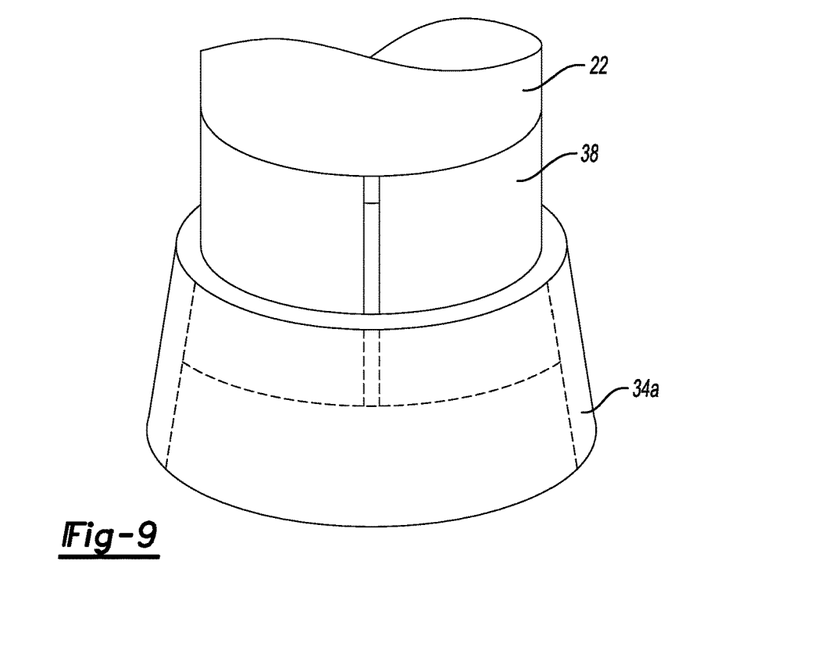
FIG. 9 illustrates the charger and selected portions of the charge port covering assembly from FIG. 6 repositioned to reflect the positioning of the charge port covering assembly in FIG. 7.

The door assembly 42 includes, on a surface that faces the charge port 20, an extension 80. As the door assembly 42 continues to pivot in the direction P, the extensions 80 eventually contact the tabs 54 of the locks 50, which pushes the tabs 54 out of the aperture 58. The inner housing 34b can then move axially within the outer housing 34a, which permits the inner housing 34a, ring segments 38, and door assembly 42, to retract into the outer housing 34a. Accordingly, the charger 22 can move closer to a coupled position with the charge port 20.

Figure 10:
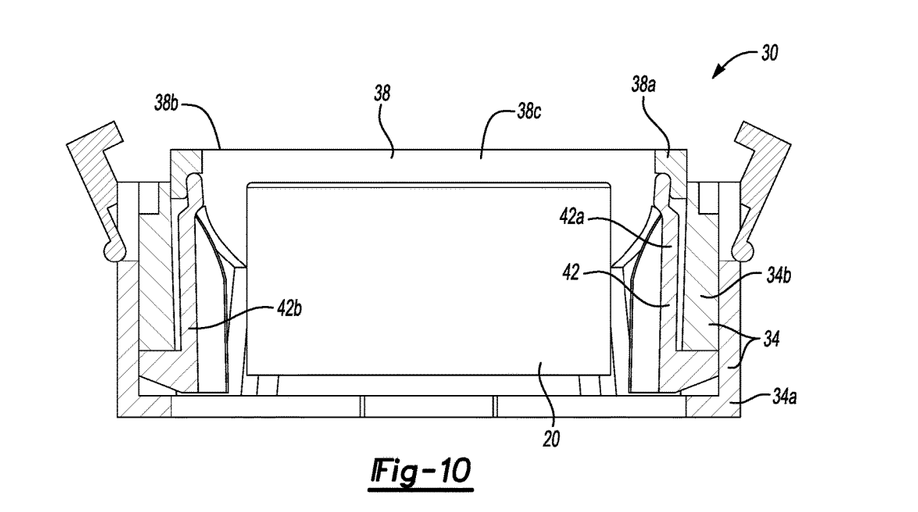
FIG. 10 illustrates the section of FIG. 4 after the charger has moved to the coupled position with the charge port.
Figure 11:
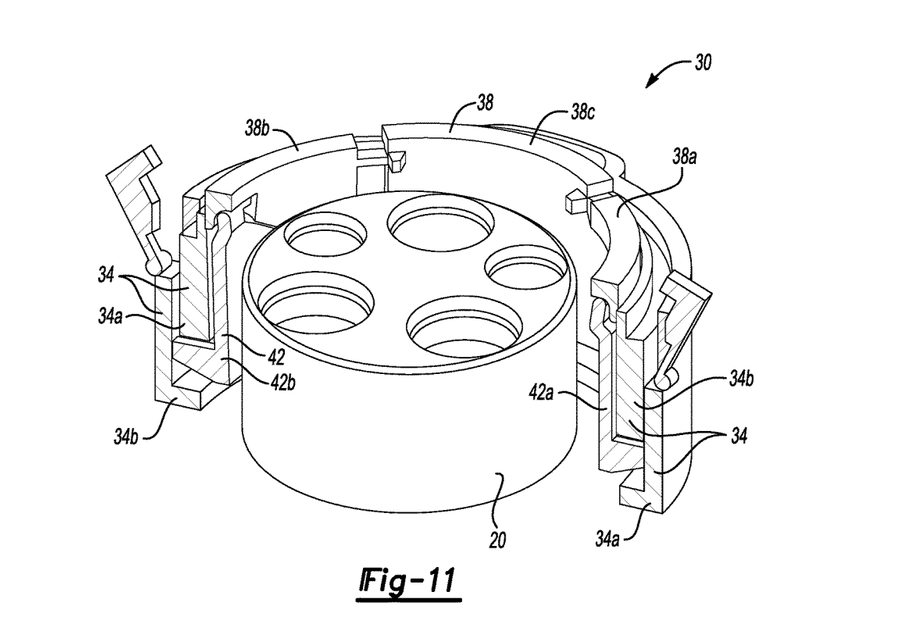
FIG. 11 illustrates a perspective view of the second of FIG. 10.
Figure 12:
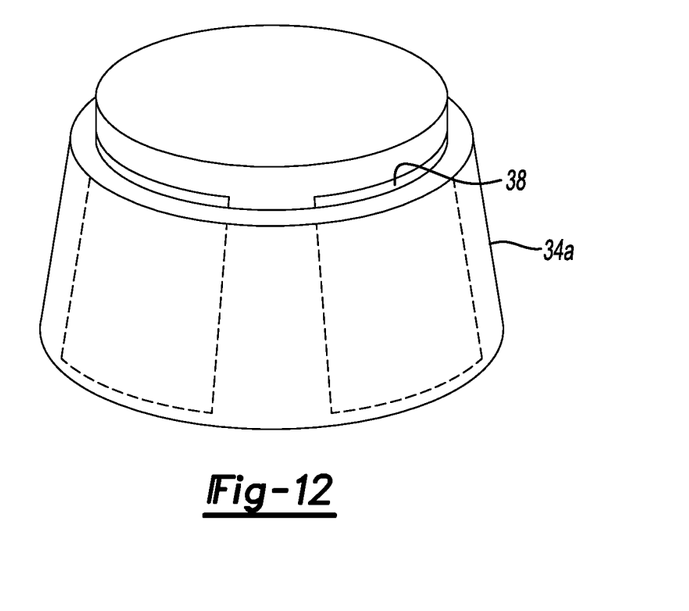
FIG. 12 illustrates the charger and selected portions of the charge port covering assembly from FIG. 6 repositioned to reflect the positioning of the charge port covering assembly in FIG. 10.

Continuing to move the charger 22 axially toward the charge port 20 forces the inner housing 34b within the outer housing 34a until the charger 22 is coupled to the charge port 20 as shown in FIGS. 10 to 12. In this position, the door assembly 42 is effectively contained radially between the charge port 20, and the housing 34. Electrical power can then communicate between the grid source 14 and the traction battery of the vehicle 10.

After a desired amount of charge has been communicated through the charge port 20, the operator can decouple the charger 22 from the charge port 20 by moving the charger 22 axially away from the charge port 20. The ring segments 38 tend to move axially away from the charge port 20 as the charger 22 is withdrawn due to the cantilever effect of the axially inward portions of the ring segments 38 riding along the surfaces of the bore 74. That is, the ring segments 38 tend to want to return to the position of FIGS. 3 to 5. The axial end portions of the ring segments 38 can be mounted to the inner housing 34b to form cantilevered features. The bending of the ring segments 38 along the axial direction will provide the force that biases the ring segments 38 away from the charge port 20. The ring segments 38 can be directly connected to the inner housing 34b (e.g., molded as one piece or snap-in mounted.

The inner housing 34b is, in this exemplary embodiment, forced axially outward by a spring-biasing force provided by springs 88. As the charger 22 is withdrawn, the springs 88 force the inner housing 34b axially away from the outer housing 34a until the inner housing 34b is in the extended position of FIGS. 3 to 5.

The door assembly 42 can be spring-biased toward the position of FIGS. 3 and 4. That is, the door assembly 42 is spring-biased toward the covering position. As the charger 22 is withdrawn along the axis A, the spring-bias forces the doors 42 to move to the covering position of FIGS. 3 and 4. Springs 90 adjacent a hinge area of the doors 42 could provide the biasing force tending to move the doors 42 to the covering position (see FIG. 3A).

Moving the doors 42 to the covering position withdraws the extension 80 from the aperture in the inner housing 34b permitting the locks 50 to return to the position of FIGS. 3 to 5. The locks 50 can be spring-biased to the position of FIGS. 3 and 5 such that when the extension 80 is withdrawn from the aperture 58, the locks 50 move back to the locking position to restrict axial movement of the inner housing 34b relative to the outer housing 34a.

Figure 13:
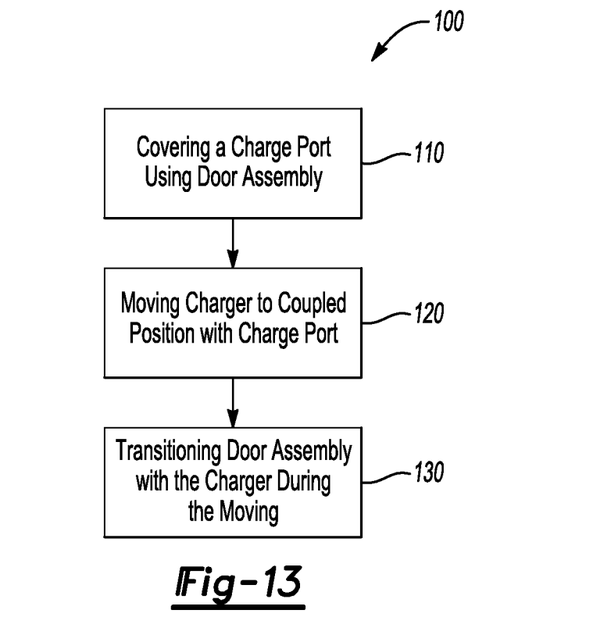
FIG. 13 illustrates an exemplary charge port covering method.

Referring now to FIG. 13, a charge port covering method 100 generally includes a step 110 of covering a charge port using a door assembly. At a step 120, the method 100 includes moving a charger to a coupled position with the charge port. During the moving, as represented by a step 130, the charger is causing the door assembly to transition from the covering position to an accessing position.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charge port covering assembly, comprising:
   a door assembly moveable between a covering position where the door assembly blocks access to a charge port, and an accessing position where the door assembly permits access to the charge port; and
   a plurality of ring segments that move radially outward in response to movement of a charger along an axis to permit the door assembly to pivot from the covering position to the accessing position.

2. The charge port covering assembly of claim 1, wherein the door assembly is pivotably connected to at least one of the ring segments within the plurality of ring segments.

3. The charge port covering assembly of claim 1, wherein the door assembly is spring-biased toward the covering position.

4. The charge port covering assembly of claim 1, wherein the charge port is disposed along the axis, and the plurality of ring segments are distributed annularly about the axis.

5. The charge port covering assembly of claim 4, wherein the plurality of ring segments are disposed within a bore of a housing, the bore having a diameter that increases moving axially toward the charge port such that the plurality of ring segments can move radially outward when a charger presses the plurality of ring segments into the bore.

6. The charge port covering assembly of claim 5, further comprising at least one lip extending radially inward toward the axis to support the door assembly in the covering position, wherein moving the plurality of ring segments radially outward moves the lip radially outward to permit the door assembly to pivot to the accessing position.

7. The charge port covering assembly of claim 6, wherein the at least one lip extends from at least one of the plurality of ring segments.

8. The charge port covering assembly of claim 4, further comprising an inner housing, an outer housing, and at least one lock, the at least one lock limiting axial movement of the inner housing relative to the outer housing when the at least one lock is in a locked position, and permitting axial movement of the inner housing relative to the outer housing when the at least one lock is in an unlocked position, wherein sufficient movement of the door assembly by the charger causes the door assembly to contact the at least one lock and move the least one lock from the locked position to the unlocked position.

9. The charge port covering assembly of claim 8, wherein the at least one lock is pivotably attached to the outer housing.

10. The charge port covering assembly of claim 8, wherein the outer housing is circumferentially distributed about the charge port.

11. The charge port covering assembly of claim 8, wherein the inner housing is spring-biased axially away from the outer housing.

12. A charge port covering method comprising:
blocking access to a charge port using at least one door assembly in a covering position;
moving a charger toward a coupled position with the charge port to transition the at least one door assembly from the covering position to an accessing position; and
holding the at least one door assembly in the covering position with at least one ledge, and moving the charger along an axis against a plurality of ring segments to move the ledge radially outward and permit movement of the at least one door assembly from the covering position to the accessing position.

13. The charge port covering method of claim 12, wherein moving the charger against the plurality of ring segments causes the plurality of ring segments to expand circumferentially relative to each other.

14. The charge port covering method of claim 12, wherein the at least one door assembly is pivotably attached to at least one of the plurality of ring segments.

15. The charge port covering method of claim 12, wherein the plurality of ring segments are disposed within a first housing that is held in an extended position relative to a second housing by at least one lock in a locked position, wherein moving the door assembly to the accessing position transitions the at least one lock to an unlocked position to permit the first housing to retract within the second housing.

16. The charge port covering method of claim 15, wherein the charger moves to an electrically coupled position with the charge port as the first housing retracts within the second housing.

17. The charge port covering method of claim 15, wherein the first housing is spring-biased toward the extended position.

18. The charge port covering method of claim 15, wherein the lock is pivotably secured to the second housing.

19. A charge port covering method comprising:
holding a door assembly in a covering position with at least one ledge, the door assembly in the covering position blocking access to a charge port; and
moving a charger along an axis against a plurality of ring segments to move the ledge radially outward and permit movement of the door assembly from the covering to an accessing position.

20. The charge port covering method of claim 19, wherein the charger can engage the charge port when the door assembly is in the accessing position.

* * * * *